United States Patent

[11] 3,625,989

[72] Inventor Ellis K. Fields
 Chicago, Ill.
[21] Appl. No. 663,245
[22] Filed Aug. 25, 1967
[45] Patented Dec. 7, 1971
[73] Assignee Standard Oil Company
 Chicago, Ill.

[54] PROCESS FOR PREPARING METHYL ANTHRANILATES
 9 Claims, No Drawings

[52] U.S. Cl. .................................................. 260/471 R,
 260/575, 260/580, 260/999
[51] Int. Cl. .................................................. C07c 101/54
[50] Field of Search .......................................... 260/471,
 580, 471 R

[56] References Cited
 UNITED STATES PATENTS
 3,318,905  5/1967  Palazzo ......................  260/471

*Primary Examiner*—Lewis Gotts
*Assistant Examiner*—L. Arnold Thaxton
*Attorneys*—Pike H. Sullivan, Arthur G. Gilkes and Gunar J. Blumberg ABSTRACT: This invention relates to the intramolecular oxidation and reduction of aromatic hydrocarbons containing at least one methyl group and a nitro group ortho to the methyl group. Further, it relates to preparing methyl o-amino arylcarboxylates and aromatic amines. The process comprises reacting aromatic hydrocarbons having at least one methyl group and a nitro group ortho to the methyl group in a solvent at a temperature of about 450° to 750° C. When the solvent is methanol, methyl o-amino arylcarboxylates useful in anesthetics, printing inks for polyethylene, and useful in the manufacture of azo dyes are produced. Novel substituted methyl anthranilates have been produced which have the foregoing uses. When the solvent is benzene, cyclohexane or toluene, aromatic amines are produced. The aromatic amines are useful as pesticides, antioxidants and as pickling inhibitors for aluminum and zinc and as curing agent for epoxy resins.

PROCESS FOR PREPARING METHYL ANTHRANILATES

This invention relates to the intramolecular oxidation and reduction of aromatic hydrocarbons containing at least one methyl group and a nitro group ortho to the methyl group. When the reaction is conducted in an inert hydrocarbon solvent such as benzene, cyclohexane or toluene, the methyl group on the methyl o-nitro aromatic hydrocarbons is oxidized and decarboxylation takes place while the nitro group is reduced to the amino group. When methanol is used as a solvent, methyl o-amino arylcarboxylates are produced. In these compounds the nitro group is reduced to the amino group but the methyl group is oxidized to the carboxylate group which is esterified by the methanol.

This invention further relates to a process for the preparation of methyl o-amino arylcarboxylates and aromatic amines. Novel methyl o-amino arylcarboxylates are prepared by reacting aromatic hydrocarbons having at least one methyl group and a nitro group ortho to the methyl group in methanol at a temperature of about 450° to 750° C.

The process of this invention is a novel one-step process. Prior to the instant invention the method for preparing methyl o-amino arylcarboxylates such as methyl anthranilates consisted of three separate steps from o-nitrotoluene or substituted o-nitrotoluene. These steps include oxidation of nitrotoluene to the o-nitrobenzoic acid. This processing step demands expensive and relatively slow oxidizing agents such as potassium permanganate or chromic acid. Air oxidation has not succeeded with o-nitrotoluenes. The second step consisted of the reduction of o-nitrobenzoic acid by hydrogenation or with iron and in acid to the o-amino benzoic acid. The third step consisted of esterification with methanol in an acid catalyst to give the methyl anthranilates.

By contrast the one-step process of this invention consists of heating the aromatic hydrocarbons containing at least one methyl group and a nitro group ortho to the methyl group such as o-nitrotoluene in methanol at a temperature of about 450°- to 750° C. to give methyl anthranilates. A further advantage of my process is that ring methyl- and poly-methyl methyl anthranilates which could not be prepared even by the prior art three-step process described above because oxidation in the first step would readily oxidize all the methyl group are easily synthesized as shown by the reaction of nitro-p-xylene and 5-nitropseudocumene in methanol. Thus, my novel process can readily produce 3-methyl anthranilates which could not be prepared by the process known in the prior art. For example, novel methyl anthranilates of the following formula have been prepared:

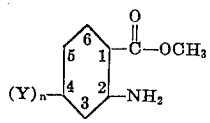

wherein Y is one of the following: fluorene, chlorine or monovalent methyl radical, and n is an integer of 1. Also the reduction in the second step of the conventional synthesis of methyl anthranilates can often reduce or hydrogenolyze out halo or other reactive groups. This danger is not involved in the process of this invention.

Furthermore, my process is useful in preparing aromatic amines from aromatic hydrocarbons containing at least one methyl group and a nitro group ortho to the methyl group when the reaction is conducted in the presence of benzene, cyclohexane, toluene at a temperature or about 450° to 750° C.

My process is useful in preparing methyl o-amino carboxylate and aromatic amines as shown from the following reaction:

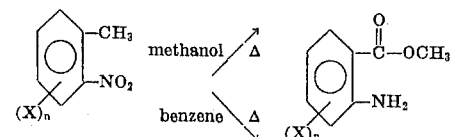

wherein X or Y is hydrogen or chlorine, bromine, alkoxy, carbomethoxy, and alkyl radical such as methyl or aryl radical, such as benzene, toluene, xylene or mixtures of these, and n is an integer from 1–4.

Further, polynuclear hydrocarbons such as biphenyl, naphthalene, anthracene, phenanthrene, pyrene, rubrene, chrysene and terphenyl, containing at least one methyl group and a nitro group ortho to the methyl group are converted in methanol at about 450° to 750° C. to methyl o-amino arylcarboxylates, or to polynuclear amines when the solvent is benzene, cyclohexane or toluene, as shown for 2-methyl-1-nitro naphthalene in the following equation:

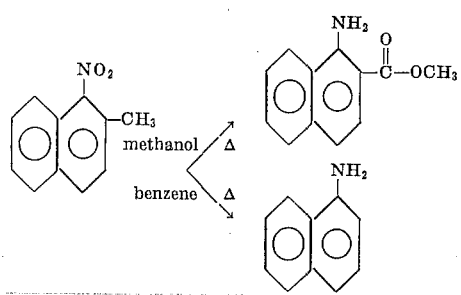

In general the process is carried out by reacting the aromatic hydrocarbon containing at least one methyl group and a nitro group ortho to the methyl group in methanol at a temperature of about to 750° C. The mole ratio of the o-nitrotoluene moiety containing aromatic compound to methanol can be 1:1 to about 1:20 and the mole ratio to benzene, cyclohexane or toluene, can be 1:1 to 1:40, and the contact time of 1–100 seconds may be used. Under the preferred condition the mole ratio of the o-nitrotoluene to methanol is 1:5 to 1:10 and the ratio of o-nitrotoluene moiety containing aromatic compound to benzene, cyclohexane or toluene can be 1:1 to 1:40. The preferred temperature is 500° to 600° C. and the preferred contact time is 5–25 seconds. The reaction is conducted under an inert atmosphere. Nitrogen helium or carbon dioxide are the preferred inert gases. In the preferred embodiment 1 mole of o-nitrotoluene is reacted in 10 moles of methanol, at a temperature of about 600° C. for about 6–8 seconds. The resulting methyl anthranilate is obtained as a residue after the methanol is distilled off. The product of my invention is useful in the manufacture of azo dyes, in printing inks for ethylene polymers and anesthetics.

In an alternative embodiment of the process of my invention, it may be run by adding 70–100 percent nitric acid, 0.5–5 moles, at 15°–30° C. to a stirred solution of 1 mole toluene in 2–20 moles benzene and contacting for 10 seconds to 30 minutes; pumping this nitration mixture from the nitration reactor into the Vycor tube at 500°–600° C. with contact times of 5–30 seconds; withdrawing the solution of aniline in benzene thus produced, and distilling to recover the benzene and to obtain the aniline. Similarly, substituted toluenes having one or both ortho positions free, may be nitrated and converted to the substituted aniline.

The following examples further illustrate my invention. Analyses and identification of products were by retention times and area percent compared to authentic samples in gas chromatographic columns containing polyethylene glycol sebacate on Chromosorb W, as well as by low voltage (7.5 uncorrected) mass spectra in a Consolidated Model 21–103c mass spectrometer, with the inlet system at 250° or 325° C., and with the repellers maintained at an average potential of 3 volts. In addition, for analysis and identification, use was made of a directly coupled gas chromatograph mass spectrometer combination also employing a 21–103c instrument with an electron multiplier in place of the Faraday-cup detector. This type of analytical tool has been described by R. S. Gohlke, Anal. Chem. 31, 535(1959); J. P. Lindeman and J. L. Annis, ibid., 32, 1742(1960); J. T. Watson and K. Biemann, ibid., 36, 1135(1964).

EXAMPLE I

A solution of 6.14 ml. (0.05 mole) o-nitrotoluene in 20.5 ml. (0.5 mole) methanol was passed through a Vycor tube containing Vycor chips at 600° C. under nitrogen flowing at 0.1 cu.ft./hr. Contact time was 7.2 seconds. The condensed product was distilled to recover 17 ml. methanol and give a residue of 3.45 g. containing 1.615 g. of methyl anthranilate; yield, 21.4 mole percent.

EXAMPLE II

The same quantities of o-nitrotoluene and methanol were reacted as in example I, except the temperature was 500° C. and the contact time was 7.9 seconds. The condensate was distilled to recover 16 ml. methanol and leave a residue of 3.75 g., which analyzed 26.9 percent o-nitrotoluene and 36 percent methyl anthranilate. The yield of methyl anthranilate was 19.4 percent.

EXAMPLE III

A solution of 8.58 g. (0.05 mole) 4-chloro-2-nitrotoluene in 20.5 ml. (0.5 mole) methanol was passed into the Vycor tube at 600° C. under nitrogen at 0.1 cu.ft./hr.; contact time was 10.6 seconds. Distillation gave 17 ml. of methanol and 3.5 g. product that contained 3.348 g. of methyl 4-chloroanthranilate. The yield was 36 mole percent.

EXAMPLE IV

A solution of 7.76 g. (0.05 mole) 4-fluoro-2-nitrotoluene in 20.5 ml. (0.5 mole) methanol was passed into the Vycor tube at 600° C. under nitrogen at 0.1 cu.ft./hr.; contact time was 11.3 seconds. Distillation recovered 17 ml. methanol and left 3.2 g. product that contained 1.785 g. of methyl 4-fluoroanthranilate. The yield was 21 mole percent.

EXAMPLE V

A solution of 7.56 g. nitro-p-xylene (0.05 mole) in 20.5 ml. (0.5 mole) methanol was passed into the Vycor tube at 600° C. under nitrogen at 0.1 cu.ft./hr.; contact time was 10 seconds. Distillation gave 17 ml. methanol and 3.8 g. product that contained 2.06 of methyl-4-methyl anthranilate. The yield was 25 mole percent.

EXAMPLE VI

A solution of 8.2 g. (0.05 mole) 5-nitropseudocumene in 20.5 ml. (0.5 mole) methanol was passed into the Vycor tube at 600° C. under nitrogen at 0.1 cu.ft./hr.; contact time was 13 seconds. Distillation gave 16 ml. methanol and 4.0 g. product that contained 1.79 g. of methyl 3,4-dimethyl anthranilate. The yield was 20 mole percent.

EXAMPLE VII

Methyl-3nitro-4-methyl benzoate was prepared for p-toluic acid according to H. King and W. O. Murch, J. Chem. Soc. (London), 127, 2639 (1925). A solution of 9.75 g. (0.05 mole) of this ester in 20.5 ml. (0.5 mole) methanol was passed into the Vycor tube at 600° C. under nitrogen flowing at 0.1 cu.ft./hr.; contact time was seconds. Distillation gave 17 ml. methanol and 3.7 g. product, that contained 0.681 g. of dimethyl-3-amino terephthalate (6 mole percent) and 2.797 g. of methyl anthranilate (37 mole percent).

EXAMPLE VIII

A solution of 9.36 g. (0.05 mole) 2-methyl-1-nitronaphthalene in 20.5 ml. (0.5 mole) methanol was passed into the Vycor tube at 600° C. under nitrogen at 0.1 cu.ft./hr.; contact time was 10 seconds. Distillation gave 13 ml. methanol and 4.8 g. product that contained 0.9955 g. of methyl-1-amino-2-naphthoate. The yield was 11 percent.

Examples of the wide utility of the methyl anthranilates of my invention include:

The manufacture of azo dyes, U.S. 2,774,755; Ger. 955,858.

As a perfume ingredient, Jap. 1831; Ger. 927,946.

In printing inks for ethylene polymers, Ger. 1,024,531.

absorbing ultraviolet light in cellulose ester film, Dutch 87,528.

As anesthetics, M. Häring, Helv. Chim. Acta. 43, 104 (1960).

EXAMPLE IX

A solution of 6.14 ml. (0.05 mole) o-nitrotoluene in 8.88 ml. (0.1 mole) benzene was passed through a Vycor tube containing Vycor chips under nitrogen flowing at 0.1 cu.ft./hr. at 600° C. Contact time was 16.3 seconds. The condensate was distilled to recover 6.1 ml. benzene and give a residue of 5.3 g., of which 2.654 g. was aniline. The yield of aniline was 57 percent.

EXAMPLE X

A mixture of 6.14 ml. (0.05 mole) o-nitrotoluene and 10.8 ml. (0.1 mole) cyclohexane was passed through a Vycor tube containing Vycor chips at 600° C. under nitrogen flowing at 0.1 cu.ft./hr. Contact time was 16.2 seconds. The condensate was distilled to recover 2 ml. cyclohexane and obtain 3.3 g. of residue, of which 1.63 g. was aniline. The yield of aniline was 35 percent.

EXAMPLE XI

A mixture of 7.56 g. (0.05 mole) nitro p-xylene and 17.76 ml. (0.2 mole) benzene was passed through a Vycor tube containing Vycor chips at 600° C. under nitrogen flowing at 0.1 cu.ft./hr. Contact time was 18.5 seconds. The condensate was distilled to recover 14 ml. benzene and obtain 5.35 g. of residue, of which 3.24 g. was m-toluidine. The yield of m-toluidine was 59 percent.

EXAMPLE XII

A mixture of 8.58 g. (0.05 mole) 4-chloro-2-nitrotoluene and 17.76 ml. benzene (0.2 mole) was passed into a Vycor tube containing Vycor chips at 600° C. under nitrogen flowing at 0.1 cu.ft./hr. Contact time was 20.1 seconds. The condensate was distilled to recover 12 ml. benzene and obtain 2.5 g. residue, of which 0.962 g. was m-chloroaniline. The yield of m-chloroaniline was 15 percent.

EXAMPLE XIII

A mixture of 8.2 g. (0.05 mole) 5-nitropseudocumene and 17.17 ml. (0.2 mole) benzene was passed into a Vycor tube containing Vycor chips at 600° C. under nitrogen flowing at 0.1 cu.ft./hr. Contact time was 20.3 seconds. The condensate was distilled to recover 15 ml. benzene and obtain 4.55 g. residue, of which 1.114 g. was 4-amino-o-xylene. The yield of 4-amino-o-xylene was 19 percent.

EXAMPLE XIV

A mixture of 9.75 g. (0.05 mole) methyl 3-nitro-4-methyl benzoate and 17.76 ml. (0.2 mole) benzene was passed into a Vycor tube containing Vycor chips at 600° C. under nitrogen flowing at 0.1 cu.ft./hr. Contact time was 28.5 seconds. The condensate was distilled to recover 13 ml. benzene and obtain 6.0 g. residue, of which 2.4 g. was methyl 3-aminobenzoate. The yield of methyl 3-aminobenzoate was 32 percent.

EXAMPLE XV

A mixture of 9.36 g. (0.05 mole) 2-methyl-1-nitronaphthalene and 17.76 ml. (0.2 mole) benzene was passed into a Vycor tube containing Vycor chips at 600° C. under nitrogen flowing at 0.1 cu.ft./hr. Contact time was 21.6 seconds. The condensate was distilled to recover 15 ml. benzene and obtain 5.1 g. residue which was almost pure 1-naphthylamine. The yield was 70 percent.

The aromatic amines produced by my invention are useful as dye intermediates, antioxidants, pesticides, extractants for hydrocarbons, pickling inhibitors for aluminum and zinc, and curing agents for epoxy resins, among others. These are but a few of the many patents dealing with the utility of the aromatic amines produced by my invention:

U.S. 2,801,979; 2,952,717
Ger. 889,488; 894,888; 1,019,083
Fr. 1,004,169; 1,020,456
Swiss 293,893

I claim:

1. The process for preparing methyl o-amino arylcarboxylates; said process comprising reacting aromatic hydrocarbons containing at least one methyl group and a nitro group ortho to the methyl group at a temperature of about 450° to 750° C. in methanol at a contact time of 1–100 seconds wherein the molar ratio of the aromatic hydrocarbon containing one methyl group and a nitro group ortho to the methanol is 1:1 to 1:20.

2. The process of claim 1 wherein the o-nitrotoluene derivative is 5-nitropseudocumene.

3. The process of claim 1 wherein the o-nitrotoluene derivative is methyl-3-nitro-4-methyl benzoate.

4. The process of claim 1 wherein the o-nitrotoluene derivative is 2-methyl-1-nitronaphthalene.

5. The process for preparing methyl anthranilates; said process comprising reacting an o-nitrotoluene derivative of the following formula:

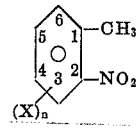

wherein X is selected from the group consisting of hydrogen, fluorine, chlorine, bromine, alkoxy, carbomethoxy, alkyl or aryl groups or mixtures of these and wherein $n$ is an integer from 1 to 4, with methanol at a temperature of about 450° to 750° C., at a contact time of 1 to 100 seconds, wherein the molar ratio of the o-nitrotoluene derivative to methanol is 1:1 to 1:20.

6. The process of claim 5 wherein o-nitrotoluene is reacted at a temperature of about 500° to 600° C. with methanol; the contact time is 5–25 seconds and the molar ratio of o-nitrotoluene to methanol is 1:5 to 1:10.

7. The process of claim 5 wherein the o-nitrotoluene derivative is 4-chloro-2-nitrotoluene.

8. The process of claim 5 wherein the o-nitrotoluene derivative is 4-fluoro-2-nitrotoluene.

9. The process of claim 5 wherein the o-nitrotoluene derivative is nitro-p-xylene.

* * * * *

UNITED STATES PATENT OFFICE
CERTIFICATE OF CORRECTION

Patent No. 3,625,989        Dated December 7, 1971

Inventor(s) Ellis K. Fields

It is certified that error appears in the above-identified patent and that said Letters Patent are hereby corrected as shown below:

Col. 2, line 34, after "about" insert "450°C."

Col. 2, line 67, "7.5 uncorrected" should be "7.5 e.v. uncorrected"

Col. 3, line 65, "seconds" should be "6.8 seconds"

Col. 4, line 60, "1.114g." should be "1.14g."

Signed and sealed this 10th day of October 1972.

(SEAL)
Attest:

EDWARD M. FLETCHER, JR.
Attesting Officer

ROBERT GOTTSCHALK
Commissioner of Patents